United States Patent [19]

Walsh et al.

[11] Patent Number: 5,195,789
[45] Date of Patent: Mar. 23, 1993

[54] SLIP LOCK CONNECTOR ASSEMBLY FOR JOINING SHEET METAL DUCTS

[76] Inventors: Timothy E. Walsh, 56 Frederick Ave., Babylon, N.Y. 11702; Thomas Howard, 288 N. Monroe St., Lindenhurst, N.Y. 11757

[21] Appl. No.: 829,426
[22] Filed: Feb. 3, 1992
[51] Int. Cl.⁵ .............................. F16L 25/06
[52] U.S. Cl. ................... 285/331; 285/424; 285/915
[58] Field of Search .............. 285/424, 915, 331, 371, 285/39 E

[56] References Cited

U.S. PATENT DOCUMENTS

| | | | |
|---|---|---|---|
| 1,935,690 | 11/1933 | Zack | 285/424 X |
| 2,275,572 | 3/1942 | Somers | 285/424 X |
| 3,246,918 | 4/1966 | Burghart | 285/424 X |
| 3,415,543 | 12/1968 | Keating | 285/424 X |
| 4,558,892 | 12/1985 | Daw | 285/424 X |
| 4,941,693 | 7/1990 | Spaude et al. | 285/915 X |

FOREIGN PATENT DOCUMENTS 1458912 12/1976 United Kingdom ................ 285/424

*Primary Examiner*—Dave W. Arola
*Attorney, Agent, or Firm*—Edward H. Loveman

[57] ABSTRACT

A slip lock connector assembly for joining end-to-end first and second flat-sided ducts made of sheet metal, has a framelike structure defined by a plurality of similar connecting members arranged in coplanar array. Each connecting member is made of pliable sheet metal bent, rolled, and molded to proper form. Each member has a flat main wall with first and second walls at opposite sides defining first and second channels. Both channels are filled with sealant material. The flat end of a side of the first duct in slipped into the first channel and secured by auxilary fastening elements, whereby the sealant in the first channel seals the connector to the flat end of the first duct. The flat end of a side of the second duct is slipped into the second channel and sealed by the sealant therein. In addition the wall of the second channel is formed with a rolled ledge which engages with lock projections on a side of the second duct to secure the second duct to the second channel. The second channel may have a laterally extending flange to stiffen the structure of the connecting member.

9 Claims, 2 Drawing Sheets

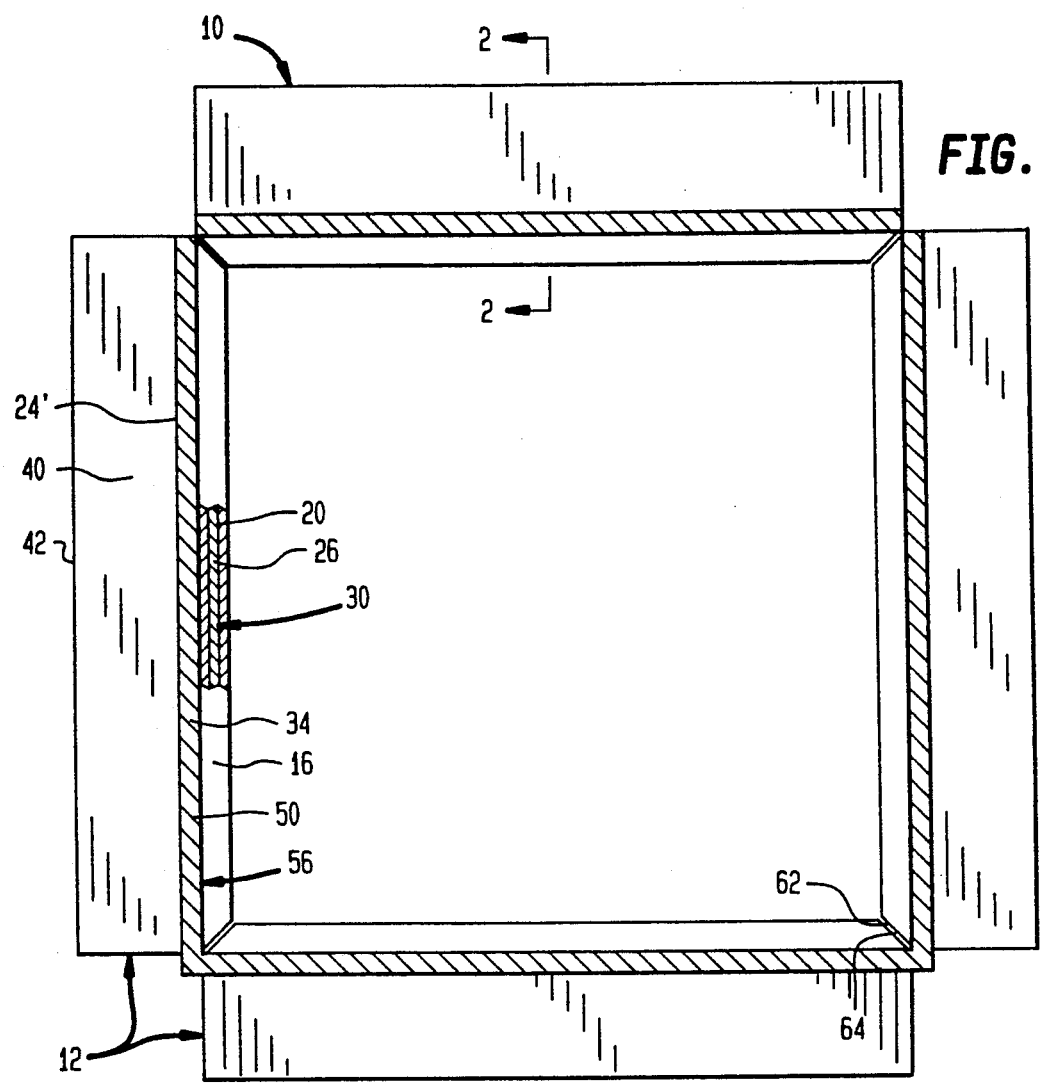
FIG. 1
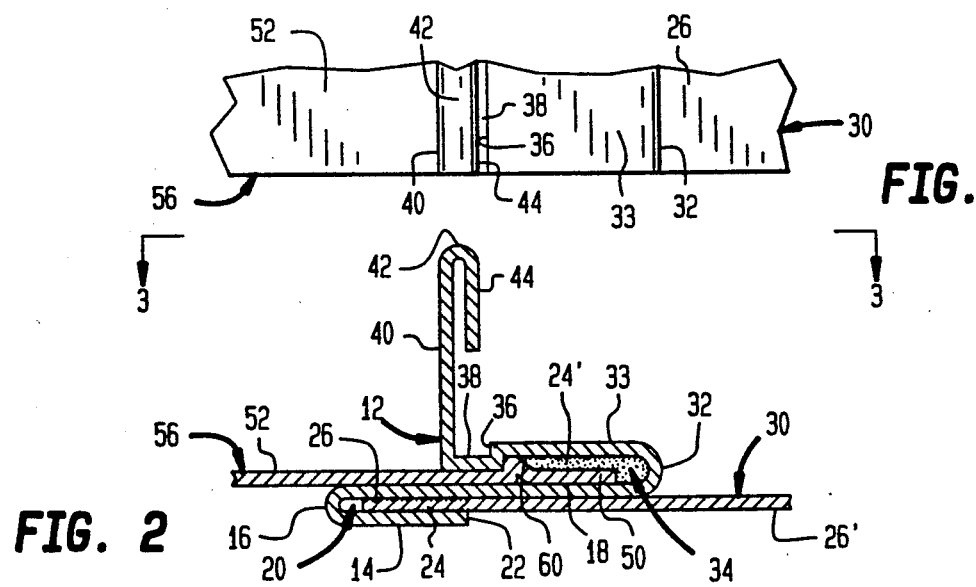
FIG. 3
FIG. 2

SLIP LOCK CONNECTOR ASSEMBLY FOR JOINING SHEET METAL DUCTS

BACKGROUND OF THE INVENTION

1. Field of the Invention

This invention relates to the art of connecting rectangular sheet metal ducts together end-to-end; and more particularly concerns a sheet metal slip lock connector assembly having members formed with channels containing a sealant for preventing leakage of conditioned air through the duct connection; and more specifically concerns a connector assembly provided with channels having walls adapted to grip wedge shaped projections on one duct to define a snap-in construction for securing that duct to the connector assembly.

2. Description of the Prior Art

Heretofore it has been conventional to employ duct connectors, which used screws bolts, clips, drives and other external hardware to connect ducts end-to-end. The prior duct container also required use of welding and metal working tools of various kinds. The prior techniques made installation of rectangular air conditioning ducts slow and laborious. In service, the connecting devices would permit leakage of conditioned air under pressure in air conditioning systems.

SUMMARY OF THE INVENTION

According to the invention the slip lock connector assembly has a main flanged connector member formed from continuously bend, rolled and molded galvanized sheet steel. The connector member has a first channel containing adhesive sealing compound which is inserted into the channel during the forming of the connector member. The connector member is disposed in a rectangular array as a frame to engage on one end of a first rectangular duct. The end of the duct is inserted into the first channel and is there sealed by the adhesive sealant compound. This operation is generally performed at the factory where the connector member is formed. Then the duct and attached connector assembly can be shipped to the field for a particular installation where a second duct will be joined to the connector assembly mounted on the first duct. If specified, the connector assembly can be secured at the factory to the end of the first duct by auxiliary fastening elements.

Each connector member has a second continuous channel also filled with an adhesive sealant. This second channel has a lateral opening which receives the end of a second rectangular duct, where the second duct is sealed by the sealant. The second channel is formed with a continuous rolled step or ledge. The second duct has a plurality of wedge shaped projections at each of its four edges. These projections snap into place behind the ledge in the second channel, and insure that the second duct is joined securely to the connector assembly. No auxiliary fastening elements, hardware, welding or metal working tools are required to secure the second duct to the connector assembly.

These and other objects and many of the attendant advantages of this invention will be readily appreciated as the same becomes better understood by reference to the following detailed description when considered in connection with the accompanying drawings in which:

BRIEF DESCRIPTION OF THE DRAWINGS

FIG. 1 is a front elevational view of a connector assembly embodying the invention, shown installed on a first duct, with portions of a second duct also shown attached to connector assembly;

FIG. 2 is an enlarged fragmentary vertical sectional view taken along line 2—2 of FIG. 1;

FIG. 3 is a fragmentary top plan view taken along line 3—3 of FIG. 2;

DESCRIPTION OF THE PREFERRED EMBODIMENTS

Figure 4:
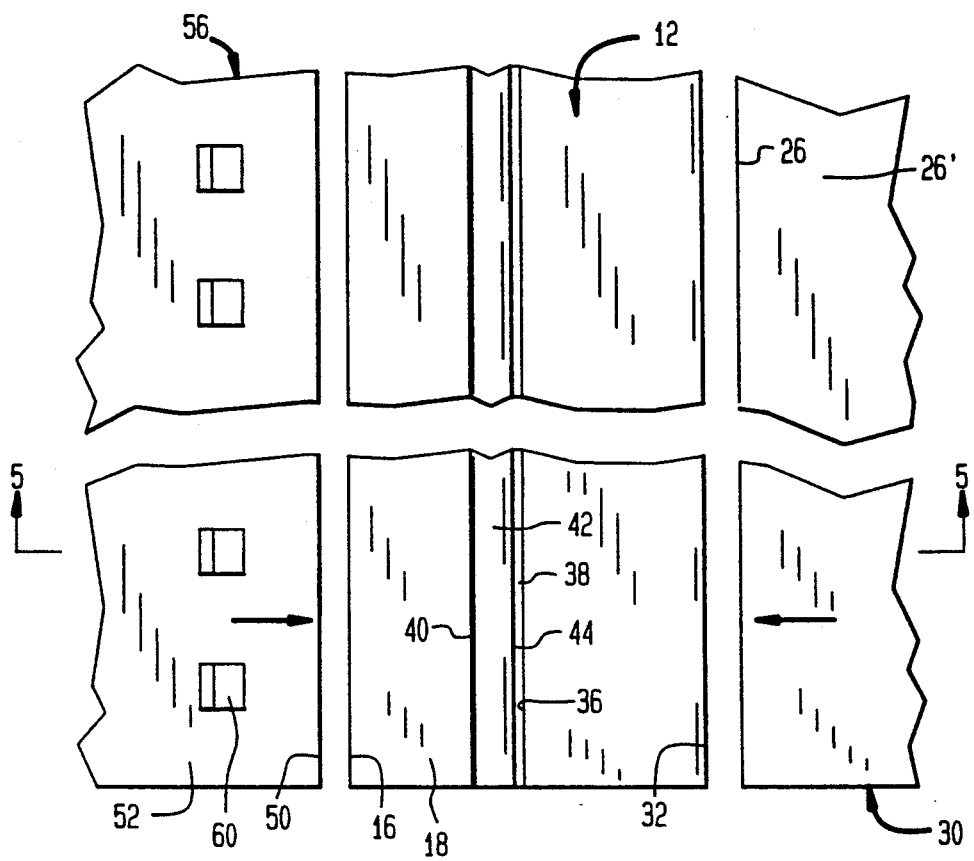
FIG. 4 is an enlarged exploded elevational view, with portions broken away, of one connector member and parts of two ducts to be joined to the connector member.
Figure 5:
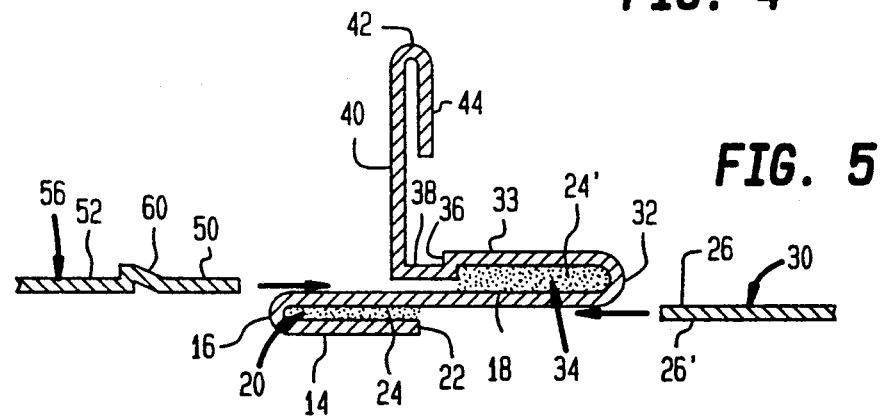
FIG. 5 is a cross sectional view of the exploded assembly of FIG. 4, taken along line 5—5 of FIG. 4.

Referring now to the drawings wherein like reference characters designate like or corresponding parts throughout, there is illustrated in FIG. 1 a connector assembly generally designated by reference numeral 10, which comprises four connector members 12 disposed at right angles to each other in coplanar array to define a four-sided framelike structure. The members 12 are all identical to each other and are shown in detail in FIGS. 1-5. Each connector member 12 is formed from a single strip of bendable sheet steel best shown in FIGS. 2,5. The strip is galvanized to protect it from corrosion. The sheet metal is molded and bent in a rolling machine or mill to form a flat side wall 14 which is bent at fold 16 and slightly spaced from a flat main body wall 18 of the connector member 12 to define a long narrow flat first channel 20 open at an edge 22. The channel 20 is filled with a highly viscous adhesive sealant 24 such as manufactured by Duro-Dyne and known as Ductlock Sealant typ DLS. The channel 20 will receive a free straight edge 26 of one side of a rectangular first duct 30. The edges 26 of the four sides 26' of the duct 30 will each be slipped and secured in a channel 20 of one of the four connector members 12; see FIGS. 1, 2 and 3.

Each connector member 12 is further bent to define a long fold 32 and a long flat wall 33 disposed parallel to and on the other side of the flat body wall 18 and slightly spaced therefrom to define a second channel 34. The channel 34 is filled with the viscous sealant 24'. A long rolled ledge 36 is formed in the wall 33 near the center of the connector member 12 between the folds 32 and 16. A narrow wall 38 extends from the ledge 36 which extends close to and perpendicular to the body wall 18 but is slightly spaced therefrom. The narrow wall 38 extends parallel to the walls 18 and 33 from the ledge 36. A relatively wide flange 40 extends outwardly of the end of the wall 38. The free end of the flange 40 is turned at a fold 42 to form narrow parallel flange 44.

The flanges 40 and 44 serve as stiffners for the members 12 of connector assembly 10 and extend for substantially the full length of each connector member 12. Free edge 50 of each of the four sides 52 of a second duct 56 can be inserted by slipping into the channel 34 until the free edge 50 of each of the four sides 52 of a second duct 56 can be inserted by slipping into the channel 34 until the free edge 50 is secured in the channel 34 by the adhesive sealant 24'. In addition, near the free end of each of the sides 52 is a plurality of spaced wedge shaped projections 60. These projections engage and look on ledge 36 in the channel 34 until the free edge 50 is secured in the channel 34 so that the duct 56 snaps into place at the ledge 36 of the connector members 12, and at the same time the sides of the duct 56 are sealed by the adhesive sealant 24'. FIG. 1 clearly shows the flanges 40 extending outwardly as stiffening bars or plates around the connector assembly 10. In order to interfit the adjacent ends of the connector members 12 at the corners of the assembly 10, the ends 62 are beveled or cut at 45° angles. The beveled edges 62 are slightly spaced to define grooves 64 shown in FIG. 1. The grooves 64 can be filled with the adhesive sealant 24'.

Figure 6:
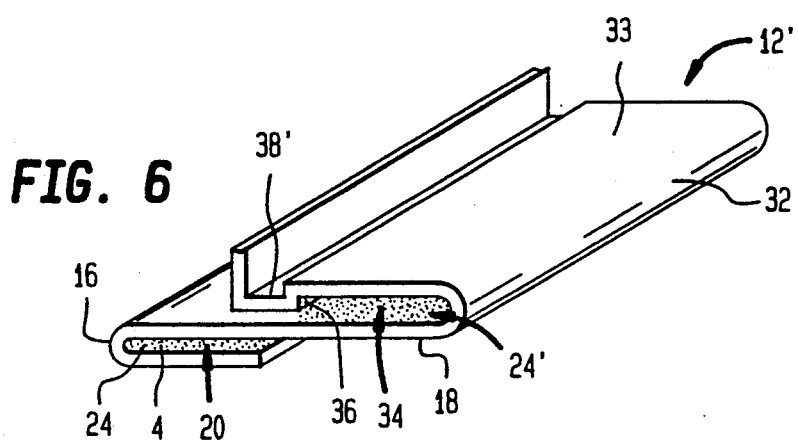
FIG. 6 is a perspective view of part of another connector member showing a modification of the structure shown in FIGS. 1-5.

FIG. 6 shows part of a connector member 12' which is familiar to the connector member 12 and corresponding parts are identically numbered. The principal difference is the omission of the flanges 40 and 44 by forming only a narrow stiffening ridge 44' at the end edge of a narrow wall 38'. When ducts to be joined end-to-end are six inches in width or less, the stiffening flanges 40 and 44 can be omitted from the connector members 12'.

In general practice, the connector members 12 and 12' will be mounted on the four-sided duct 30 at the plant or factory where the connector members are bent, rolled and molded. The viscous adhesive sealants 24 and 24' will be inserted into channels 20 and 34 before the connector members are mounted on the end of the duct. The beveled edges 62 will also be cut at the assembly plant. If desired or required by specifications, auxiliary fastening devices can be applied at the assembly plant to the walls 14 to hold the connector members 12 or 12' more securely on the end of duct 30. When the first duct 30 with connector assembly 10 attached are shipped to an installation site, the second duct 56 can be slipped in or inserted and doubly locked and secured in channels 34 of the connector assembly 10 at the installation site. The installation is accomplished by attaching one edge 50 between the walls 33 and 18 until the projections 60 lock on ledge 30. Then the other edges 50 are slipped one by one into position. It will be noted that no fastening elements, auxiliary hardware, welding or other metal working tools are needed to join the duct 56 to the connector assembly 10. The end-to-end joining of duct 56 to duct 30 via assembly 10 will be quick, leakproof, and troublefree. The other end of the duct 30 can, if desired, be provided with another connector assembly 10 for quick attachment of another duct 56 thereat.

The connector members can be made of any suitable gauge metal, but it has been found in practice that for air conditioning ducts, the sheet metal should be of 18-gauge, 20-gauge, 22-gauge or 24-gauge galvanized steel. If necessary, a hole may be provided in the wall 38 adjacent the flange 40, to accommodate a conventional sheet metal fastener to extend through the second duct 56 and the first duct 30 in order to comply to a local building code.

It should be understood that the foregoing relates to a limited number of preferred embodiments of the invention which have been by way of example only, and that it is intended to cover all changes and modifications of the examples of the invention herein chosen for the purposes of the disclosure, which do not constitute departures from the spirit and scope of the invention.

What is claimed is:

1. A slip lock connector assembly for joining end-to-end first and second flat-sided ducts made of sheet metal, comprising:

a plurality of connector members disposed in a framelike coplanar array, each of said members being made of molded, rolled and bent sheet metal, each of said members having a main flat wall and integral first flat wall radially spaced from one side of said main wall to define a laterally open first channel therebetween for receiving a free end of one flat side of said first duct;

a first filling of highly viscous adhesive sealant compound in said first channel for adhering to and sealing said one side of said first duct in said first channel;

a second flat wall integral with, and radially spaced from the other side of said main wall and parallel to said main wall to define therewith a second channel open laterally for receiving a free end of one flat side of said second duct; and a second filling of highly viscous adhesive sealant compound in said second channel for adhering to and sealing one side of said second duct in said second channel;

said second wall of said connector member having a ledge formed along its length and extending into said second channel for engaging and locking projections on said one side of said second duct to cooperate with said second filling of sealant for sealing said one side of said second duct in said second channel, so that said first and second ducts can be secured in end-to-end alignment by said connector members.

2. A slip lock connector assembly as claimed in claim 1, further comprising a flat flange integral with said second wall of each of said connector members and extending away from said first and second ducts for structurally stiffening said connector members.

3. A slip lock connector assembly as claimed in claim 2, further comprising a second flat flange and cooperating therewith in structurally stiffening said connector members.

4. A slip lock connector assembly as claimed in claim 3, wherein each of said connector members has beveled end edges interfitting with beveled edges of adjacent connector members, said bevelled edges of adjacent connector members being slightly spaced to receive sealant material to prevent leakage of air from said joined ducts at corners of said framelike array.

5. A slip lock connector for joining end-to-end first and second flat-sided ducts made of sheet metal, comprising:

a sheet metal body molded rolled and bent to form a main flat wall and integral radially spaced first and second flat walls at opposite sides of said main flat wall defining therewith first and second channels;

first and second fillings of highly viscous sealant in said first and second channels respectively, for receiving, and sealing ends of two flat sides of said first and second ducts respectively;

a ledge formed on said second flat wall of said second channel extending inwardly toward said main flat wall; and projections on a side of said second duct for locking against said ledge in said second channel for holding said side of said second duct securely in said second channel.

6. A slip lock connector member as claimed in claim 5, wherein said sheet metal body is made of galvanized steel having a thickness ranging from eighteen to twenty-four gauge.

7. A slip lock connector member as claimed in claim 5, wherein said sheet metal body is formed with a flange extending away from said main, first and second flat walls for structurally stiffening the same,
   wherein said sheet metal body is formed with a double-walled flange extending away from said main first and second flat walls for structurally stiffening the same.

8. A slip lock connector member as claimed in claim 5 wherein said first named sheet metal body has a bevelled end edge for interfitting with a second similarly formed sheet metal body of a second connector member disposed coplanar with said first sheet metal body at a corner defined by said first and second sheet metal bodies.

9. A slip lock connector member as claimed in claim 8 further comprising a sealant at said interfitted bevelled edges to prevent air leakage thereat from said ducts at said first and second connector members.

* * * * *